US011347688B2

(12) United States Patent
Srivas et al.

(10) Patent No.: US 11,347,688 B2
(45) Date of Patent: *May 31, 2022

(54) KEY-VALUE STORE FOR MAP REDUCE SYSTEM

(71) Applicant: HEWLETT PACKARD ENTERPRISE DEVELOPMENT LP, Houston, TX (US)

(72) Inventors: Mandayam C. Srivas, Union City, CA (US); Pindikura Ravindra, Hyderabad (IN); Uppaluri Vijaya Saradhi, Hyderabad (IN); Amit Ashoke Hadke, San Jose, CA (US); Jason Frantz, San Francisco, CA (US); Chandra Guru Kiran Babu Sanapala, Hyderabad (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/408,094

(22) Filed: May 9, 2019

(65) Prior Publication Data

US 2019/0272254 A1 Sep. 5, 2019

Related U.S. Application Data

(63) Continuation of application No. 15/298,440, filed on Oct. 20, 2016, now Pat. No. 10,289,689, which is a
(Continued)

(51) Int. Cl.
*G06F 16/00* (2019.01)
*G06F 16/17* (2019.01)
(Continued)

(52) U.S. Cl.
CPC .......... *G06F 16/1727* (2019.01); *G06F 16/11* (2019.01); *G06F 16/116* (2019.01);
(Continued)

(58) Field of Classification Search
CPC .............. G06F 16/1727; G06F 16/221; G06F 16/2282; G06F 16/278; G06F 16/178; G06F 16/11; G06F 16/13
See application file for complete search history.

(56) References Cited

U.S. PATENT DOCUMENTS 8,156,421 B2   4/2012   Chhajer et al.
8,214,388 B2   7/2012   Uppala
(Continued)

FOREIGN PATENT DOCUMENTS

JP    02-028877 A    1/1990
JP    H02-028877     1/1990

OTHER PUBLICATIONS

Chang, Fay et al., "Bigtable: A Distributed Storage System for Structured Data", OSDI '06 7th USENIX Symposium on Operating Systems Design and Implementation, Nov. 6, 2006, pp. 205-218, 14 pages.
(Continued)

*Primary Examiner* — Khanh B Pham
(74) *Attorney, Agent, or Firm* — Jaffery Watson Mendonsa & Hamilton

(57) ABSTRACT

The disclosed embodiments relate to a computer-implemented method for column-oriented access to data. The method can include inserting data into a data store. The data is randomly or sequentially retrievable from the data store by ordering keys for a table in a key-value store and recursively dividing a key space of said table into tablets that each have a range of possible keys. The tablets each contain partitions for key sub-ranges and each partition contains segments. Further, operations on tablets are distributed on different nodes and operations on partitions or segments are handled by using different threads.

24 Claims, 13 Drawing Sheets

Related U.S. Application Data continuation of application No. 14/028,427, filed on Sep. 16, 2013, now Pat. No. 9,501,483.

(60) Provisional application No. 61/702,683, filed on Sep. 18, 2012.

(51) Int. Cl.
| | |
|---|---|
| *G06F 16/11* | (2019.01) |
| *G06F 16/13* | (2019.01) |
| *G06F 16/178* | (2019.01) |
| *G06F 16/22* | (2019.01) |
| *G06F 16/27* | (2019.01) |

(52) U.S. Cl.
CPC ............ *G06F 16/13* (2019.01); *G06F 16/178* (2019.01); *G06F 16/221* (2019.01); *G06F 16/2282* (2019.01); *G06F 16/278* (2019.01)

(56) References Cited

U.S. PATENT DOCUMENTS

| | | | | |
|---|---|---|---|---|
| 8,484,351 | B1 * | 7/2013 | Dean | G06F 16/13 709/226 |
| 8,738,624 | B1 | 5/2014 | Wang et al. | |
| 8,930,312 | B1 | 1/2015 | Rath et al. | |
| 2007/0033354 | A1 * | 2/2007 | Burrows | G06F 16/184 711/156 |
| 2009/0063437 | A1 * | 3/2009 | Hendrey | H04L 63/0807 |
| 2010/0106934 | A1 | 4/2010 | Calder et al. | |
| 2011/0179100 | A1 | 7/2011 | Kawai | |
| 2011/0196882 | A1 * | 8/2011 | Kesselman | G06F 16/27 707/753 |
| 2011/0314027 | A1 * | 12/2011 | Xu | G06F 16/2228 707/743 |
| 2012/0016901 | A1 | 1/2012 | Agarwal et al. | |
| 2012/0109892 | A1 | 5/2012 | Novik et al. | |
| 2012/0254175 | A1 | 10/2012 | Horowitz et al. | |
| 2012/0278323 | A1 * | 11/2012 | Chattopadhyay | G06F 16/283 707/737 |
| 2012/0303791 | A1 * | 11/2012 | Calder | G06F 9/5083 709/224 |
| 2013/0124467 | A1 | 5/2013 | Naidu et al. | |
| 2013/0330301 | A1 * | 12/2013 | Wasielewski | A61K 38/19 424/93.7 |
| 2015/0113535 | A1 | 4/2015 | Goda et al. | |

OTHER PUBLICATIONS

Ongaro, Diego et al., "Fast Crash Recovery in RAMCloud", Operating Systems Principles, ACM, New York, NY, Oct. 23, 2011, pp. 29-41.

Rumble, Steve, "Tablet Profiling in RAMCloud", Retrieved from the Internet: URL: https://ramcloud.atlassian.net/wiki/download/attachments/6848659/RAMCloud_sedcl_retreat_2011_rumble.pdf, retrieved on Jul. 21, 2016, Jun. 4, 2011, 22 pages.

Borthakur, D., "HDFS Architecture Guide", 2008, 14 pages.

Dean et al., "MapReduce: Simplified Data Processing on Large Clusters", OSDI'04: In Proceedings of OSDI '04: 6th Symposium on Operating Systems Design and Implementation, USENIX Association, Dec. 2004, pp. 137-149.

Ghemawat et al., "The Google File System", Proceedings of the nineteenth ACM symposium on Operating systems principles, Oct. 2003, pp. 29-43.

Hadoop Wiki, "Introduction", Project Description, available online at <https://web.archive.org/web/20100526102050/http://wiki.apache.org/hadoop/ProjectDescription>, May 26, 2010, 2 pages.

Hoff, T., "LevelDB—Fast and Lightweight Key/Value Database From the Authors of MapReduce and BigTable", High Scalability, available online at http://highscalability.com/blog/2011/8/10/leveldb-fast-and-lightweight-keyvalue-database-from-the-auth.html, Aug. 10, 2011; 4 pages.

Wikipedia, "Apache HBase", available online at https://en.wikipedia.org/w/index.php?title=Apache_HBase&oldid=511411456, Sep. 8, 2012, 2 pages.

Wikipedia, "Apache Hive", available online at https://en.wikipedia.org/w/index.php?title=Apache_Hive&oldid=511777404, Sep. 11, 2012, 3 pages.

Wikipedia, "Apache LevelDB", available online at https://en.wikipedia.org/w/index.php?title=LevelDB&oldid=508492167, Aug. 21, 2012, 2 pages.

Wikipedia, "Apache ZooKeeper", available online at https://en.wikipedia.org/w/index.php?title=Apache_ZooKeeper&oldid=493828450, May 22, 2012, 2 pages.

\* cited by examiner

KEY-VALUE STORE FOR MAP REDUCE SYSTEM

CROSS REFERENCE TO RELATED APPLICATIONS

This application is a continuation of U.S. patent application Ser. No. 15/298,440, filed Oct. 20, 2016, which is a continuation of U.S. patent application Ser. No. 14/028,427, filed Sep. 16, 2013, now U.S. Pat. No. 9,501,483, which claims priority to U.S. provisional Patent Application No. 61/702,683, filed Sep. 18, 2012, each of which applications are incorporated herein in their entirety by this reference thereto.

BACKGROUND OF THE INVENTION

Technical Field

The invention relates to computer file systems. More particularly, the invention relates to a table format for a map reduce system.

Description Of The Background Art

Apache Hadoop (High-availability distributed object-oriented platform) is an open-source software framework that supports data-intensive distributed applications. It supports the running of applications on large clusters of commodity hardware. Hadoop was derived from Google's MapReduce and Google File System (GFS) papers.

The Hadoop framework transparently provides both reliability and data motion to applications. Hadoop implements a computational paradigm named MapReduce, where the application is divided into many small fragments of work, each of which may be executed or re-executed on any node in the cluster. In addition, it provides a distributed file system that stores data on the compute nodes, providing very high aggregate bandwidth across the cluster. Both MapReduce and the distributed file system are designed so that node failures are automatically handled by the framework. This enables applications to work with thousands of computation-independent computers and petabytes of data. The entire Apache Hadoop platform is now commonly considered to consist of the Hadoop kernel, MapReduce, and Hadoop Distributed File System (HDFS), as well as a number of related projects, including Apache Hive, Apache HBase, and others.

Hadoop is written in the Java programming language and is an Apache top-level project being built and used by a global community of contributors. Hadoop and its related projects, e.g. Hive, HBase, Zookeeper, and so on, have many contributors from across the ecosystem. Though Java code is most common, any programming language can be used with streaming to implement the "map" and "reduce" parts of the system.

HBase is an open source, non-relational, distributed database modeled after Google's BigTable and is written in Java. It is developed as part of Apache Software Foundation's Apache Hadoop project and runs on top of HDFS (Hadoop Distributed Filesystem), providing BigTable-like capabilities for Hadoop. That is, it provides a fault-tolerant way of storing large quantities of sparse data.

HBase features compression, in-memory operation, and Bloom filters on a per-column basis. Tables in HBase can serve as the input and output for MapReduce jobs run in Hadoop, and may be accessed through the Java API but also through REST, Avro, or Thrift gateway APIs. However, there are drawbacks to HBase. For example opening a snapshot of an Hbase table requires a recovery operation to be performed, potentially requiring mutation of the on-disk structures. This mutation is required because Hbase cannot easily synchronize operations with the underlying file system.

A further concern in such systems is that of Write amplification (WA), which is an undesirable phenomenon associated with flash memory and solid-state drives (SSDs), where the actual amount of physical information written is a multiple of the logical amount intended to be written. Because flash memory must be erased before it can be rewritten, the process to perform these operations results in moving (or rewriting) user data and metadata more than once. This multiplying effect increases the number of writes required over the life of the SSD, which shortens the time it can reliably operate. The increased writes also consume bandwidth to the flash memory, which mainly reduces random write performance to the SSD. Many factors affect the write amplification of an SSD; some can be controlled by the user and some are a direct result of the data written to and usage of the SSD.

Systems such as LevelDB, which is a fast key-value storage library written at Google, provide an ordered mapping from string keys to string values. However, LevelDB has restricted branching factors and unlimited depth, such that write amplification can reach 20× under normal operations. Hbase, discussed above, has a fixed and small number of levels of sub-division and the write amplification is small, but required restructuring operations are very large and cannot proceed in parallel nor be sub-divided. This can lead to occasional dramatic drops in write and update rates.

SUMMARY OF THE INVENTION

Embodiments of the invention, referred to as MapR DB, comprise a key-value store that provides column-oriented access to data in a distributed and fault tolerant manner. Data can be inserted into MapR DB and data can be retrieved either randomly or sequentially from MapR DB at high rates.

The general idea behind MapR DB is that keys for a table are ordered and the entire table is divided into key ranges. Each key range is handled by a structure called a table which itself is divided into key ranges. Each range in a tablet is called a partition. Partitions are also divided into segments.

This recursive division into smaller and smaller key ranges has several benefits. One benefit is parallelism. At the highest level, operations on tablets can be distributed to different nodes. At lower levels, different threads can handle operations on individual segments. In addition, large-scale restructuring operations can be decomposed into operations on individual segments in such a way that a global lock on the larger objects does not need to be kept across the entire operation. By having multiple levels of successive division, the size of each segment can be kept relatively small so that operations on segments can be accomplished quickly. As a result, MapR DB always services requests within a very small period of time. Restructuring at the tablet level can also be done without a gap in service because MapR DB uses redirection links that allow accesses and updates to proceed during the restructuring.

MapR DB also integrates tightly into the MapR file system. Doing this has a number of benefits, including prominently the ability to use standard file system operations, such as snapshots and mirrors, on MapR DB tables directly. One benefit of this is that tables can be opened without having to replay a log and, thus, read-only tables can be opened without any recovery operations. In contrast, opening a snapshot of an Hbase table requires a recovery operation to be performed, potentially requiring mutation of the on-disk structures. This mutation is required because Hbase cannot easily synchronize operations with the underlying file system. MapR DB, in contrast, can and does synchronize operations with the underlying file system, which is why a table snapshot is directly usable.

The particular decomposition of a table progressively into tablets, partitions, and segments has particular benefits as well that are not found in other log-structured data bases. First, the number of times a block of data must be written and rewritten to disk during an update and subsequent restructuring operations is a key limiting factor on performance. For systems such as LevelDB which have restricted branching factors and unlimited depth, this write amplification can reach 20× under normal operations. For systems such as Hbase, which has a fixed and small number of levels of sub-division, the write amplification is small, but required restructuring operations are very large and cannot proceed in parallel nor be sub-divided. This can lead to occasional dramatic drops in write and update rates. MapR DB avoids both large write amplification and long restructuring delays by careful and non-uniform decomposition of tables into progressively smaller tablets, partitions, and segments.

MapR DB also implements a superset of common key-value database operations. This allows MapR DB to operate with or without a schema and to provide column-oriented performance for data that appears to contain nested data structures. Different application libraries can emulate different interfaces on the same table, which provides a high degree of system design flexibility.

Keys and data in MapR DB can be independently configured to always live in memory to maximize speed, to be on solid-state disk, or reside on hard disk. This flexibility gives MapR DB the ability to tune the performance-cost tradeoff per column family.

DETAILED DESCRIPTION OF THE INVENTION

Communication Between Components

Figure 1:
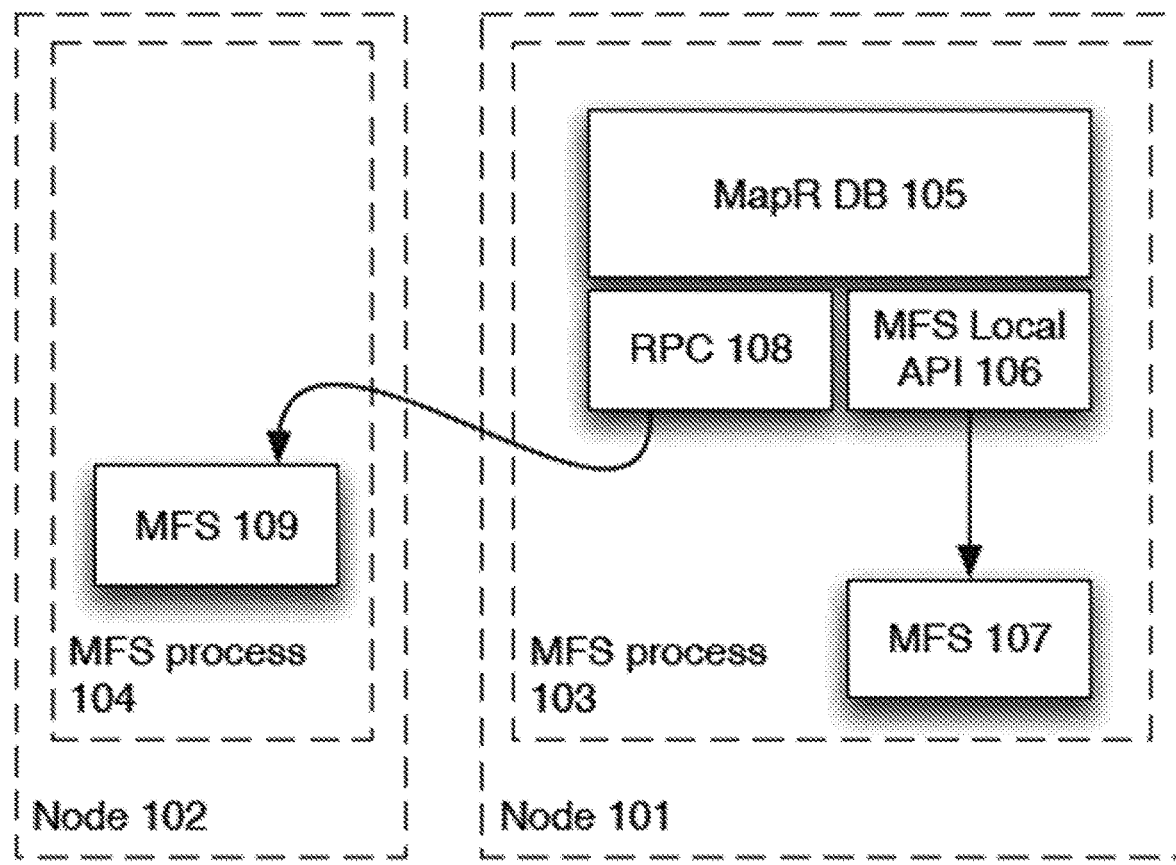
FIG. 1 is a block schematic diagram that shows two computers or nodes that each have a MapR FS or MFS process running.

FIG. 1 shows two computers or nodes 101, 102 that each have a MapR FS or MFS process 103, 104 running. In FIG. 1, the MapR DB (MDB) process is part of the file system stack in a MapR system. It communicates to local MapR fileserver (MFS) components of the file system using a local API or it can communicate with remote MFS components using the normal file client API. This allows MDB components to reside in the same process as the local MFS components or in a separate process as desired. Integrating the MDB component with the MFS into the same process allows faster communication and results in higher overall performance.

Within the MFS process 103, there are several software components, including the MapR DB 105 and the MFS proper 107. The MapR DB component 105 can communicate with the MFS 107 in the same process using standard procedure calls via the MFS local API 106. The MapR DB 105 can also communicate with an MFS component 109 in another MFS process 104 on another node 102 via a remote procedure call (RPC) interface 108.

Direct integration of the MapR DB 105 with the MFS 107 into a single process 103 allows substantial performance that is not available to a database that does not have this direct access. Further, use of the RPC 108 that is integrated in the MFS process 103 allows the MapR DB 105 to make use of any security facilities that may be part of the RPC mechanism 108.

Figure 2:
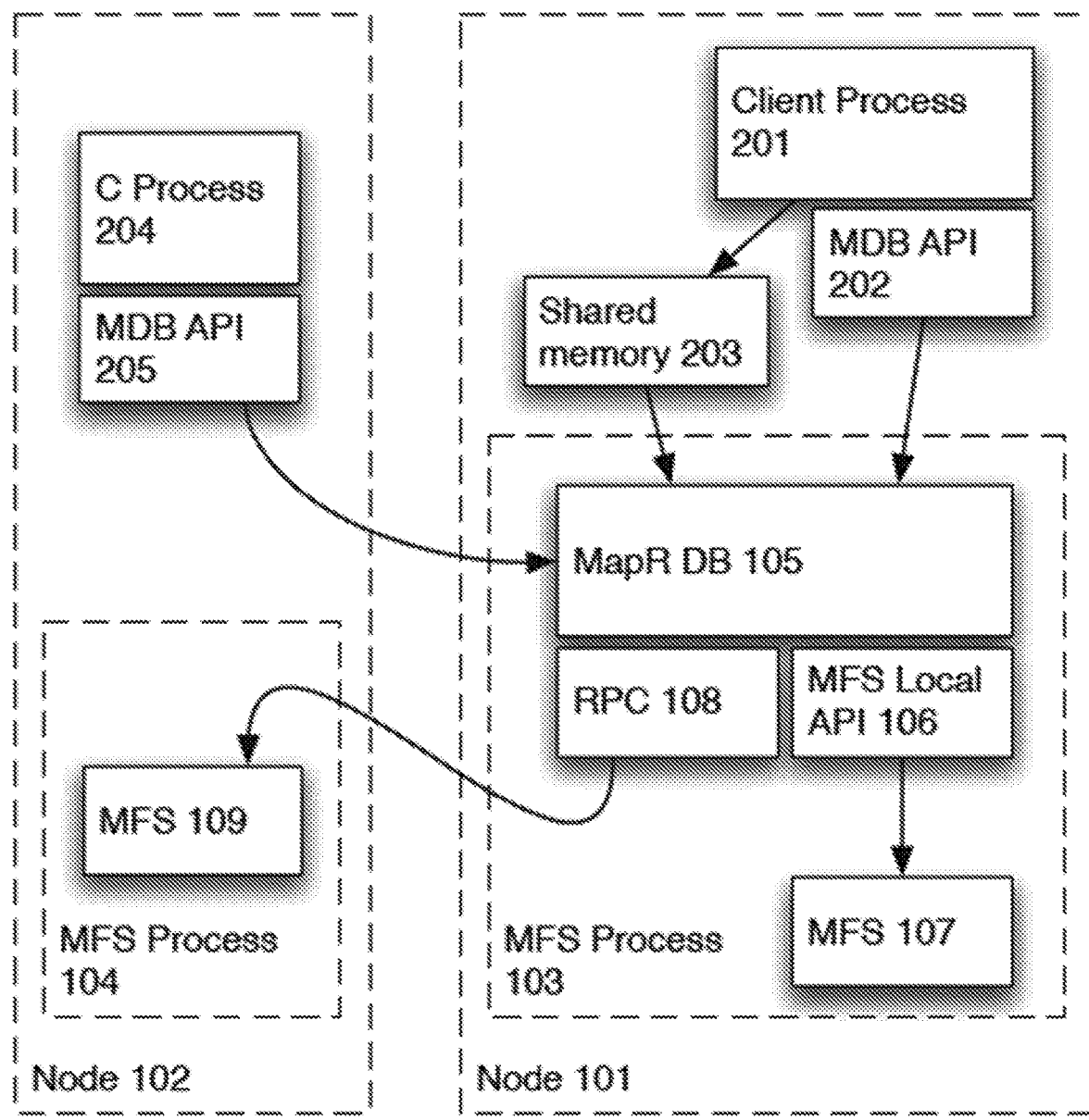
FIG. 2 is a block schematic diagram that shows how the components illustrated in FIG. 1 can be accessed by a client processes collocated on the same node as the MFS process via a local MapR DB API.

FIG. 2 shows how the components illustrated in FIG. 1 can be accessed by a client processes 201 collocated on the same node 101 as the MFS process 103 via a local MapR DB API 202. In FIG. 2, Java processes can communicate with the MDB component of the file system using the MDB API. If the Java process is running on the same node as the MDB component, then shared memory can be used to transfer large objects directly and at higher speed than would be possible using the API.

The local API allows large data objects to be passed from the client process 201 to the MapR DB 105 via a shared memory 203, thus allowing substantially higher throughput. In addition, a client process 204 running on a different node 102 can access the MapR DB component 105 running on the original node 101 via an RPC-based API 205 that sends requests over an inter-node network connection.

Some networking technologies, such as Infiniband, allow so-called RDMA transfers to be made in which data is transferred from the memory image of one process on a first node to the memory of the second process on a second node by the network interface itself. Such RDMA interfaces can be used to implement an equivalent of the shared memory interface 203 used by a MapR DB client 201 to communicate with an MFS process 103 on the same node. This allows a MapR DB client 204 on a different node 102 to communicate at nearly the same rates possible as if it were on the same node.

Recursive Division of a Table into Tables, Partitions, and Segments

Figure 3:
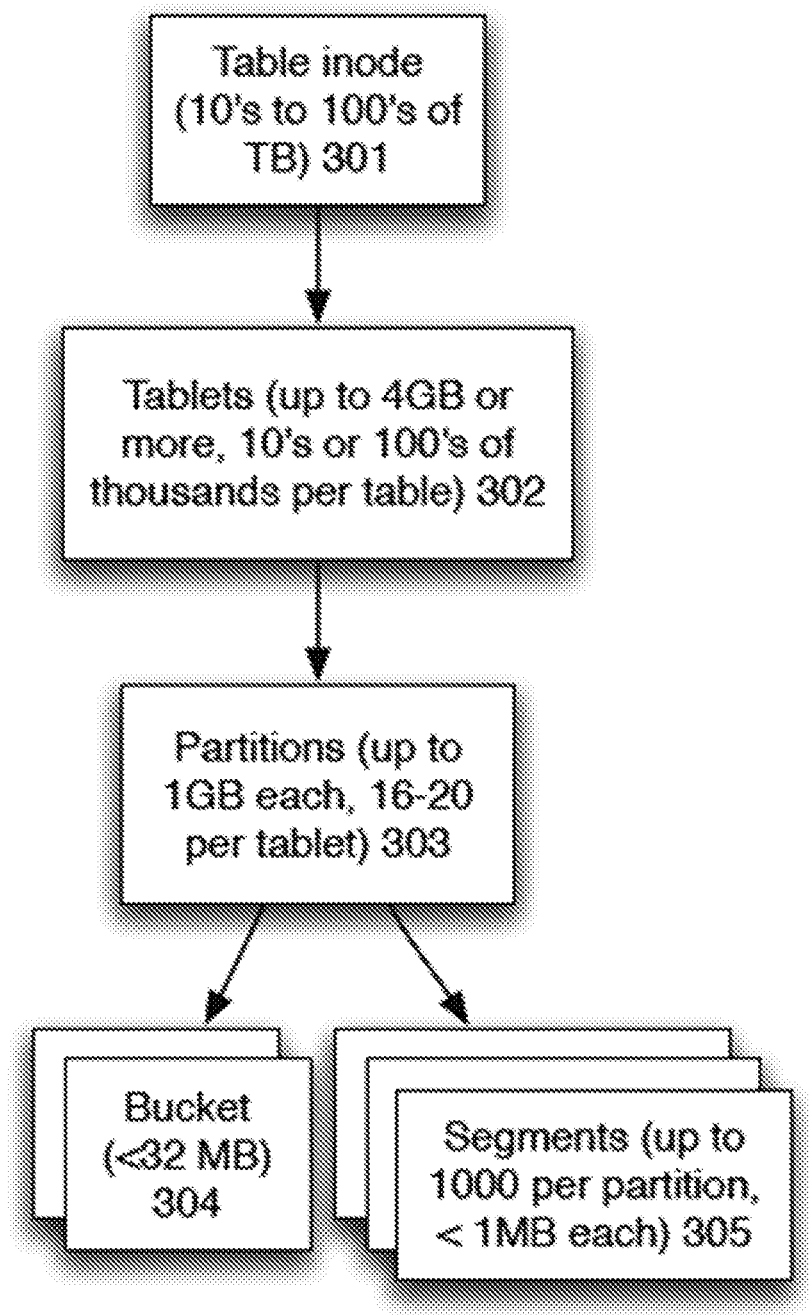
FIG. 3 is a hierarchical diagram that shows how a table, potentially containing tens or hundreds of terabytes (TB) of data, can be decomposed into many tablets, each of which contains up to a few gigabytes (GB) of data.

In FIG. 3, recursive division is performed on a table's key space. A table contains tablets, each of which is assigned a particular range of possible keys. Each tablet contains partitions for key sub-ranges. Each partition has a single actively updated bucket and many segments, one for each sub-sub-range of key values. Once a bucket gets to a limited size, a new bucket is allocated and the previous bucket is spilled to the segments. Partially spilled buckets stay active until they are completely spilled so there is no loss of service during this spilling.

The wide fanout from table to tablets and from partition to segments, and the use of a single layer of recursive division, limits the write amplification of MapR db to about 4.5 disk writes per database update. This is in contrast to approximately 20 writes per update for LevelDB. Hbase has low write amplification, but is subject to long compactions and occasional delays as a result.

Thus, FIG. 3 shows how a table 301, potentially containing tens or hundreds of terabytes (TB) of data, can be decomposed into many tablets 302, each of which contains up to a few gigabytes (GB) of data. The number of tablets 302 can be very large, conceivably even hundreds of thousands or more. This very large number of tablets is different from systems such, as Hbase and Big Table, which cannot support so many tablets. Having a very large number of tablets is key to the low write amplification of MapR DB that is achieved without the normal cost of very large compaction operations. Tablets can be distributed across a potentially very large cluster or even across multiple clusters. Each tablet is handled by an MFS process running on some node as was illustrated in FIGS. 1 and 2. No separate process, such as a region server or tablet server, is required because all operations on tablets are handled by the MapR DB component, which is a native component of the MapR FS process.

Tablets are divided into several partitions 303. Typically, the number of partitions in a tablet is in the range 16 to 20 per tablet, although this number can be increased or decreased as well. Partitions are limited in size to a few hundred megabytes (MB) up to a gigabyte or so.

Each partition has a small number of buckets 304 and a much larger number of segments 305. Updates to the database are initially written to the currently active bucket for a partition until the bucket reaches approximately 32 MB in size. At that point, a new bucket is allocated and the system distributes the contents of the bucket to the various segments in the background as processing continues. During heavy write loads, there can be several buckets being spilled to the segments at one time. The data in each bucket is also contained in a table in memory so that reads to recently written data can be satisfied very quickly.

There can be many, potentially thousands or more, segments per partition. Each segment is typically limited to about 1 MB in size so that it can be read or written in roughly a single disk rotation. Smaller segments still require a disk rotation to read or write, while larger segments require multiple rotations to read or write. This makes the roughly 1 MB size an optimal median value.

Details of Table Inode Structure

Figure 4:
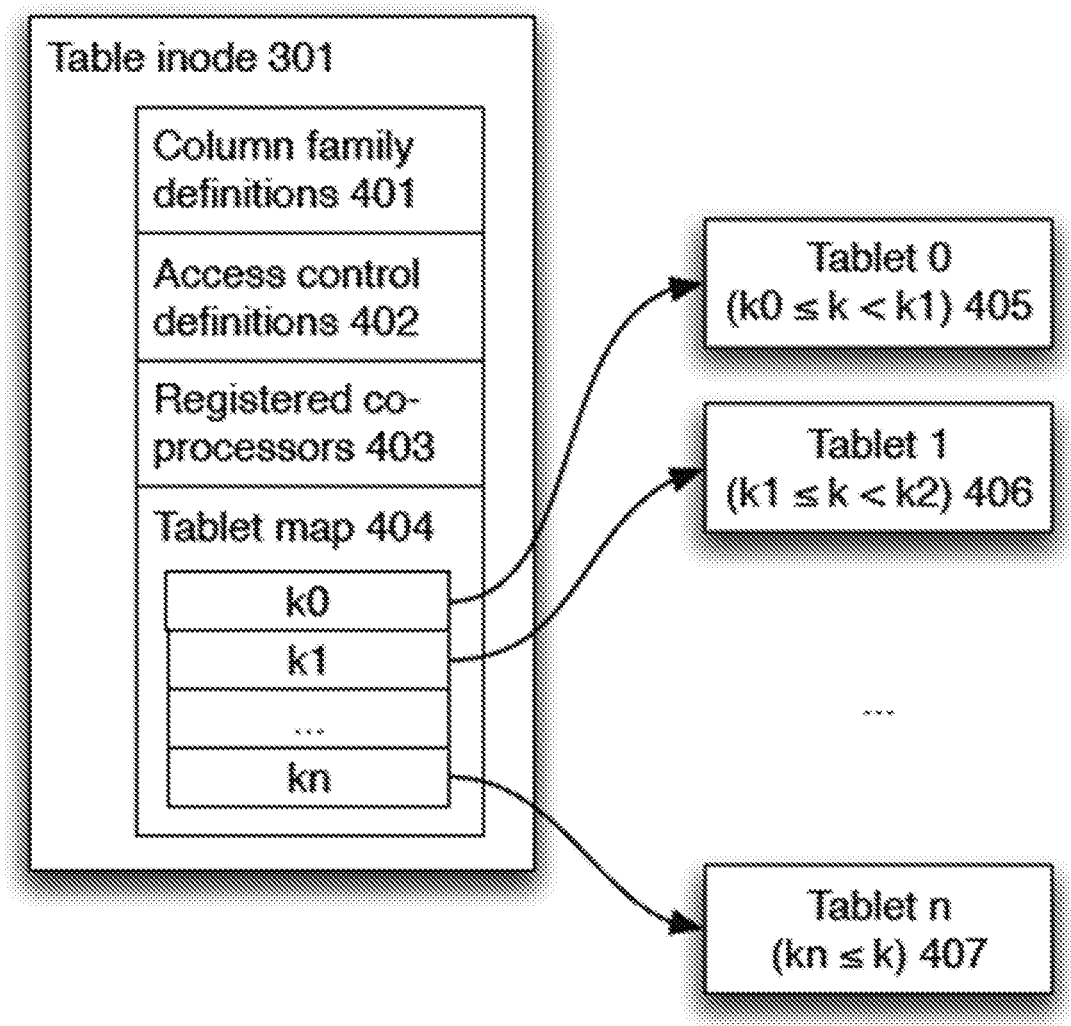
FIG. 4 is a block schematic diagram that shows the detailed structure of a table inode.

FIG. 4 shows the detailed structure of a table inode. In FIG. 4, linking is from a tablet map inside the table inode structure to tablets based on key range. The inode that defines the table contains a variety of meta-data, including column schema data, access control information, and information about coprocessors that have been registered for this table. In addition, there is a map that relates key ranges to particular tables. The tablet map has one key value for each tablet. The range of keys has an inclusive starting point at the key in the tablet map and an exclusive end at the next key in the table map. The set of keys for the last tablet is only bounded below.

As shown in FIG. 4, the table is stored as a special type of inode so that it can make use of the robust atomic operations on key-value trees provided by MapR FS. The table inode 301 from FIG. 3 is shown in FIG. 4 to contain column family definitions 401, access control definitions 402, registered co-processors 403, and a tablet map 404. The column family definitions 401 describe the column families defined for the table. These column family definitions determine how data is ultimately stored in segments in the lower level parts of the table. The access control definitions 402 determine which operations are allowed by various users and members of groups.

In an embodiment of the invention, the tablet map 404 is implemented as a native b-tree in the MapR FS. Requests are dispatched according to the key they refer to by looking the key up in the tablet map. This lookup operation causes the key space to be split into half-open key ranges 405, 406, each with an inclusive lower bound and an exclusive upper bound. The last range 407 has only a lower bound. As values are inserted, those values with a key lower than the lowest key in the tablet map are used to update that lowest value so that the lowest value in the tablet map is always less than or equal to the smallest key in the entire table. The pointers to tablets are ordinary inode references that contain a container id and inode number and are resolved using standard MapR FS operations.

Details of Tablet Inode Structure

Figure 5:
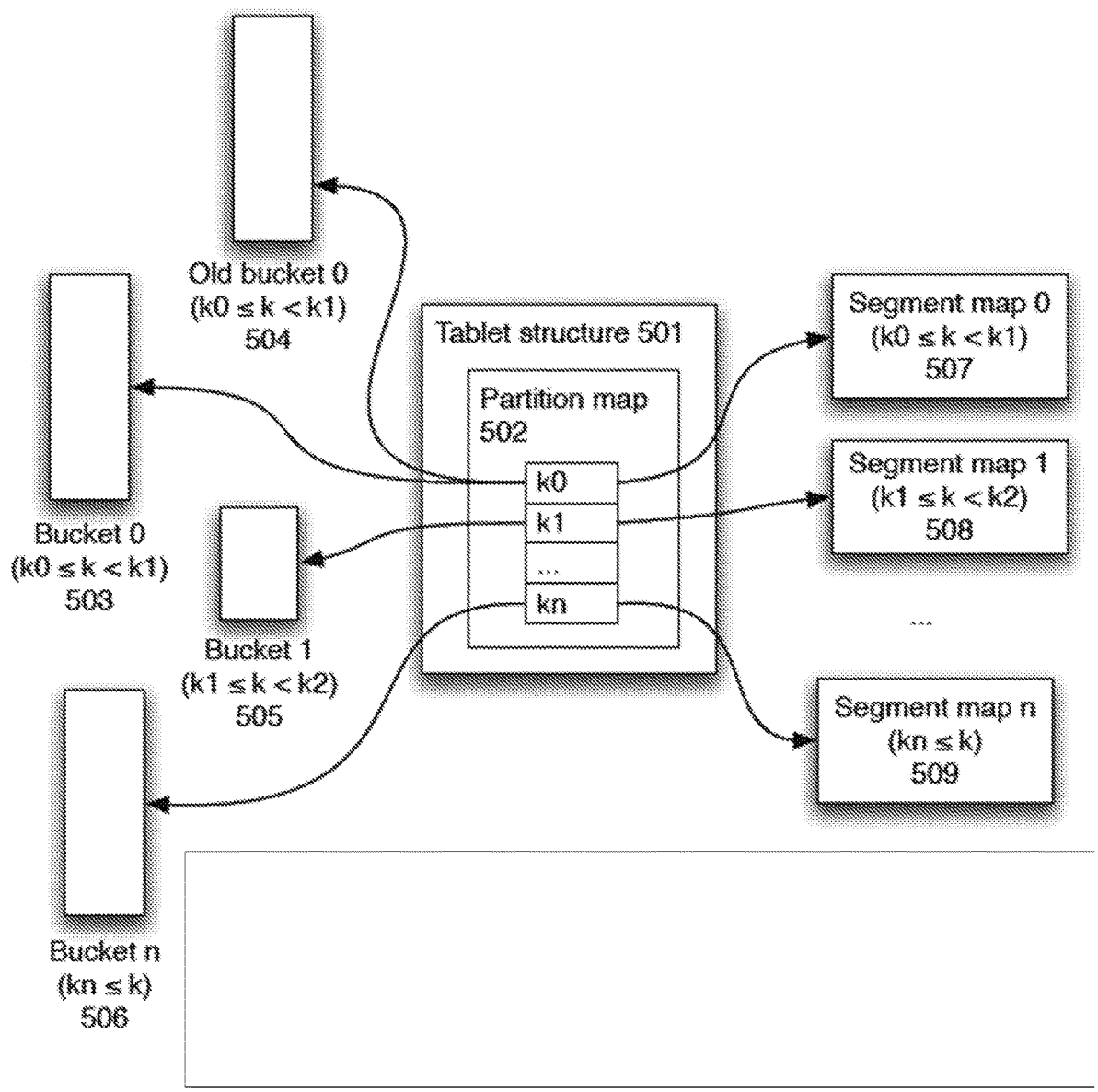
FIG. 5 is a block schematic diagram that shows the internal structure of a tablet.

FIG. 5 shows the internal structure of a tablet 501. In FIG. 5, tablet structure is shown with partition map links to buckets and segment maps. Each segment map notionally contains many segments, so a single partition in the partition map consists of a single active bucket and many segments. Previously active buckets are retained while being spilled into the segments associated with the partition.

This structure is stored as a specialized inode in the MapR FS. The key part of the tablet inode is a b-tree map that divides the key range for a tablet in a similar way that the tablet map 404 from FIG. 4 divided the key space for the entire table. For each key range, there is a reference to one or more buckets 503, 504, one of which is the current bucket for the partition. Other key ranges have their own buckets 505, 506.

Each key range also has a reference to a segment map, 507, 508, 509. The key range for the last key in the partition is notionally unbounded, but the keys associated with the last buckets 506 and the last segment map 509 are actually usually bounded by the key range of the tablet 501 itself, as defined in the tablet map 404 in the table inode structure, as shown in FIG. 4.

The tablet dispatches the operations it receives from the table level to the correct partition. At that point, the segment map is used to further define what processing is done.

Figure 6:
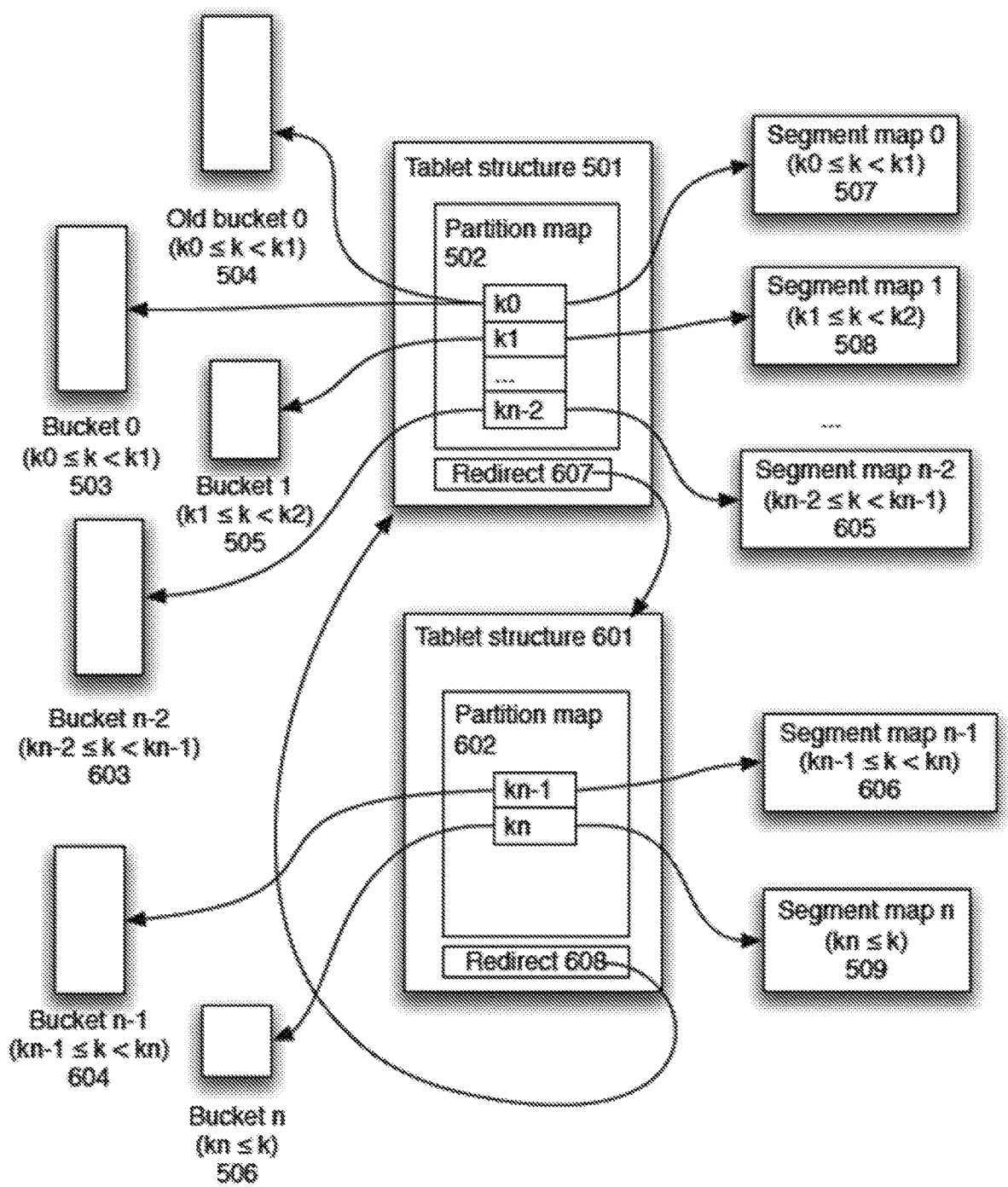
FIG. 6 is a block schematic diagram that shows how redirect links are used to allow two tablets to function as one during a long-running operation, such as a table split or merge.

FIG. 6 shows how redirect links are used to allow two tablets to function as one during a long-running operation, such as a table split or merge. In FIG. 6, a tablet structure is shown in which partition maps can be split or merged using redirect pointers. FIG. 6 shows a split in progress. At this point, the redirect pointers have been established, the new tablet structure has been created and two partitions (n−1 and n) have been copied from the original tablet structure to the new one. Nevertheless, searches in the original table for keys in the ranges served by the partitions already moved can still be found by following the redirect pointer from the original tablet to the new one.

Thus, in FIG. 6 the tablet 501, partition map 502, buckets 503, 504, 505, and associated segment maps 507, 508 are as shown in FIG. 5. References to the bucket 506 and segment map 509, however, have been moved to the new tablet inode 601, which ultimately contains items from the last half of the key space handled by the original table 501. Additional buckets 603 and 604 that were omitted from FIG. 5 for clarity, and associated segment maps 605, 606 are shown in FIG. 6 to illustrate how some bucket and segment map combinations might have been moved or not.

This copying of bucket and segment maps to the new tablet 601 may not be as straightforward as simply adjusting pointers because the new tablet may be on another container entirely. To keep the buckets and segment maps local to the tablet inode, it may be desirable to actually copy the contents of the segment maps to the container where the new tablet inode is located. Copying the contents of the buckets can be avoided by allocating a new bucket in the new container and then flushing the old buckets to their segments after copying the segment maps.

During the split process, the redirect links serve multiple functions. First, they provide an indicator that a merge or split is in progress. The second function is to allow the two tablet inodes to function as one during the split so that all operations proceed with no indication that a split is in progress.

A tablet merge can be handled by the same mechanisms except in reverse. In this case, buckets are allocated in the tablet that survive the merge and segment maps are copied to the surviving tablet. The redirect pointers serve essentially the same purpose as during a split: they make the two tablets appear as one during the merge operation. When the merge is done, the redirect links can be removed and the surviving tablet is a complete merge of the two tablets.

Special handling of splits of the tablet at the beginning or end of a table can facilitate the performance under sequential key insertion loads. Normally, the key space for a tablet is split in such a way as to cause the resulting tablets to have roughly the same amount of data. When splitting tablets on either end of the table, however, it is advantageous to split the tablet so that a large majority of the data is retained in the interior tablet of the two. For random insert loads, this causes the tablets at each end of the key range to split less often than is ideal and the tablets adjacent to the edge to be split slightly more often than is optimal, but as a table grows, these edge effects become negligible.

For sequential ascending or descending insertion loads, however, unbalanced splitting of edge tablets can significantly improve performance by decreasing the rate of tablet splitting by 10× or more. Decreased tablet splitting, in turn, decreases the write amplification of the entire system because data is not copied as often.

Alternative Tablet Splitting Algorithm

Figure 7:
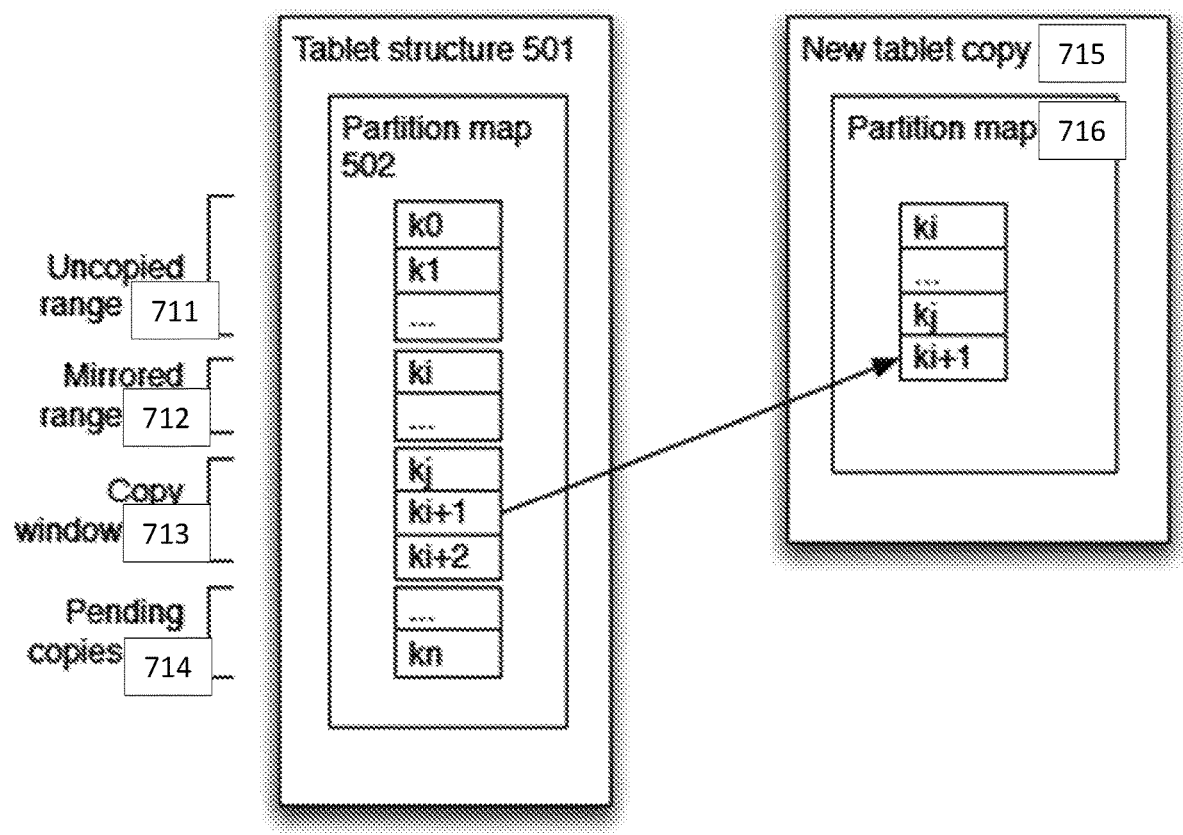
FIG. 7 is a block schematic diagram that shows an alternate copy algorithm that uses a mirrored range, a copy window, and a pending copies region.

Tablet splitting can be implemented in another way as well, without redirect pointers. In this alternative tablet split algorithm, a progressive copy is done with more and more of the source tablet being mirrored to the new copy. FIG. 7 shows an alternate copy algorithm that uses a mirrored range 712, a copy window 713, and a pending copies region 714. In the mirrored range, updates to the original tablet 501 are mirrored to the new tablet copy 715 having a partition map 716. In the copy window, updates are held back while the copy proceeds. After the copy completes, the copy window region is added to the mirrored range and the updates proceed in a mirrored fashion. In the pending copies, updates to the original tablet 501 are not mirrored to the new copy.

During this copy operation, the original tablet key range is divided in four ranges as shown in FIG. 7. The first part consists of keys that remain in the original tablet and is called the uncopied range. The keys that are copied are divided into three parts. These include those keys that have already been copied. These are called the mirrored range. Another part consists the small range of keys known as the copy window. These keys are the ones that are currently being copied. The last part consists of data associated with keys after the cursor range and is called the pending range.

For keys in the uncopied range, all updates are applied only to the original version of the tablet. For keys in mirrored range, all updates received by the original tablet are forwarded to the new tablet copy with acknowledgements being returned only after both updates have been applied. For keys in the copy window, all updates are held back while the keys and data in the copy window are copied. As soon as the window is moved forward to a new set of keys from the pending range, the updates are released and handled as normal. When these updates are released, the keys that were previously in the copy window are now in the mirrored range and thus these updates are applied to both the original and the new copy. In the pending range, all updates are simply applied to the original copy.

During this copy, all new data objects are created in the MapR FS orphanage. When the copy is complete, a reference to the new tablet is put into the tablet map. If this reference is not inserted, due to a failure during the copy, the orphanage mechanism shortly removes all references to the newly created objects. This has the effect of creating the tablet copy with only very short update delays and an apparently atomic update to the tablet map. On failure, no visible change to the table structure is made and all dangling data objects are cleaned up transparently.

Logically speaking, copying part of the contents of a tablet during a split can proceed in several ways. Copying can start at either the beginning or the end and proceed toward the opposite end. Copying can also start at some point in the middle and proceed toward either end.

If copying starts in the middle of a tablet, the copy operation must complete or be completely discarded. As such, it may be preferable to start copies from either end. As previously mentioned, the starting point of the copy can be set so that the tablets after the split are unequal in size according to whether they are at the beginning or end of the table or based on other factors such as pattern of updates.

Copies starting from either end can be terminated at any time without losing work and it may be useful to choose to terminate the copy based on any of a number of factors. There may be a minimum or maximum fraction to be copied. Another way to decide to stop copying might be to copy until the average number of transactions being applied to copied portions of a tablet has reached a critical amount. A combined strategy of copying until the number of transactions going to the new copy exceeds the number of transactions going to the old copy combined with a limit on the maximum amount to copy, e.g. 90% of the tablet, is one way to implement the asymmetric splits described earlier.

Details of Segment Map Structure

Figure 8:
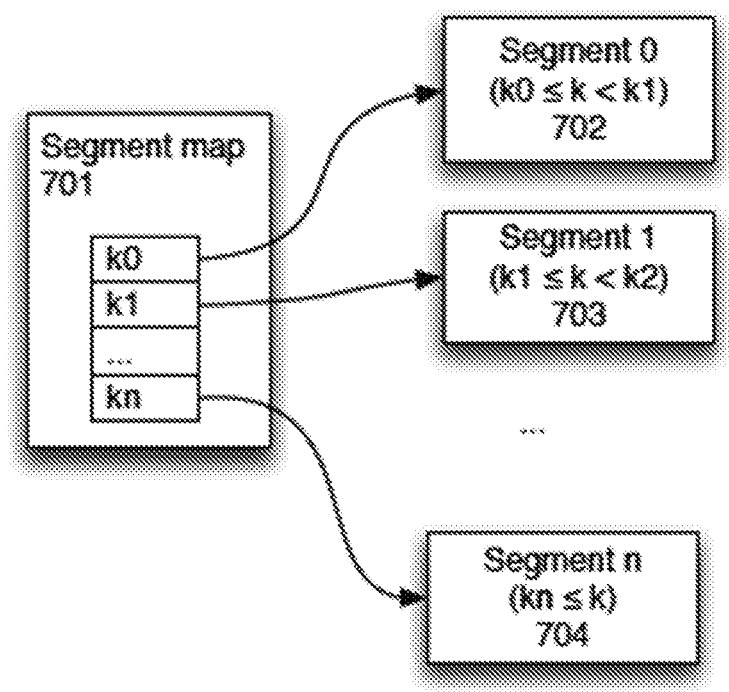
FIG. 8 is a block schematic diagram that shows the internal structure of a segment map.

FIG. 8 shows the internal structure of a segment map. In FIG. 8, each segment map refers to the many segments. Half-open key ranges define which entries each segment contain. As with tables and tablets, a MapR FS b-tree serves to define the segment map 701 itself. The segment map is used to divide the key range for the segment map into half-open ranges for segments such as 702 and 703. The last key in the segment map defines the half unbounded key range for the last segment 704.

Details of Segment Structure

Figure 9:
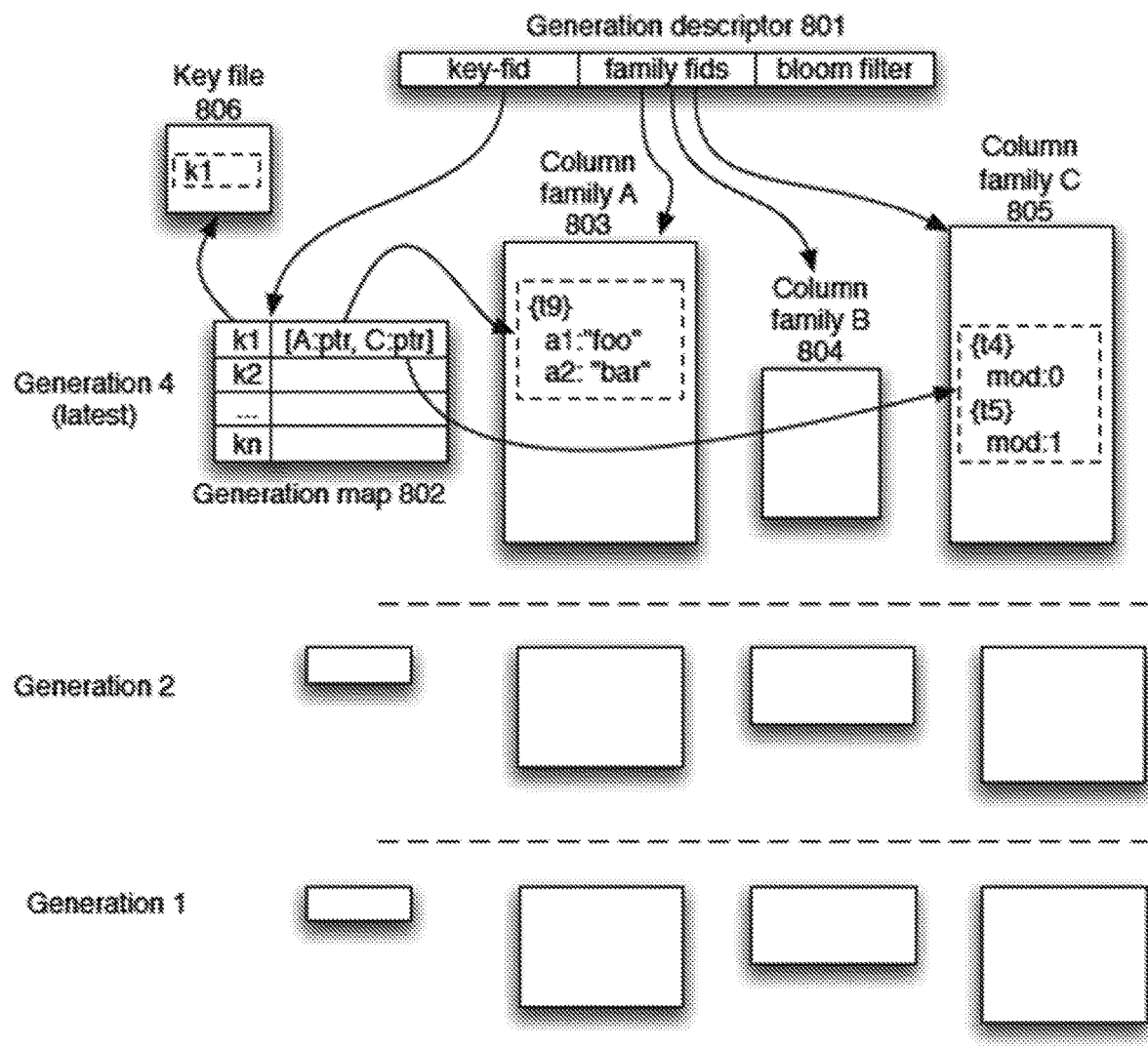
FIG. 9 is a block schematic diagram that shows the internal structure of a segment.

FIG. 9 shows the internal structure of a segment. In FIG. 9, each time the bucket for a group of segments fills up, the contents are sorted and copied down into the segments to form a new generation. Over time, generations are merged. If a segment gets too large, it can be split. If splitting a segment causes the segment map to become too large, that segment map can be split, as shown earlier.

Splitting segment maps increases the number of partitions in a partition map. That can cause the partition map to become larger than desired, thus triggering the splitting of the tablet containing the partition map. Splitting is actually done by compacting several generations. After a compaction, old generations are kept for a few tens of seconds to allow all pending operations to complete.

At the beginning of the compaction, all writes are redirected to the active bucket of the newly compacted generation so the only pending operations can be reads which, by nature succeed or fail within a short time.

Each segment with all generations is contained in a special inode known as a spillmap. This use of a special inode allows atomicity and failure tolerance properties to be inherited from the container structure in the MapR file system.

Thus, each time a bucket in a partition fills up, a new bucket is allocated and the contents of the bucket are spilled into all of the segments in the partition. At the segment level, this is done by writing out a correlated set of files known as a generation. This generation consists of a generation descriptor 801 that contains references to the generation map file 802, the column family files 803, 804, 805, and a Bloom filter. The generation map file refers to a map that contains keys and references to offsets in the column family files. The column family files 803, 804, 805 contain data entries that have a timestamp and a set of key-value pairs. The timestamp allows previous data values to be retained, if desired. For very large keys, the actual key value is stored in a separate file. When rows in the table are deleted, a special entry is put in the generation map to indicate deletion with a timestamp.

Each generation in a segment has a parallel structure. Generations can be combined to eliminate out of date values in a table. Because all updates are directed to the bucket for the partition in which a segment is found, the combination of generations can proceed without worrying about updates to generations as long as only one combination is done at a time to any single segment. When the combination is complete, the segment map is updated atomically.

Because the generation map and each column family are ultimately stored as independent file-like objects in the MapR FS, each can be controlled separately in terms of whether they are retained in memory, on solid-state disks (SSD), or on normal disks. This means that the keys and each column family can independently be given independent treatment in this regard to optimize performance.

Special KV-Store Operations

File rename can consist of an atomic insert and delete in the directory. Generalization of this allows the creation, rename, or remove of multiple files at once in a kv-store in an atomic fashion. This is important because there are multiple places where it is necessary to create and replace existing files, or where multiple files must be created together (or none, e.g. column files).

Files can be created in an unlinked state. If the operation of writing them fails, they disappear. When the writes are done, the files must be atomically upgraded to the linked state and the deletion of the bucket file has to be atomic.

In compaction, multiple generations can be taken together and replaced atomically with a compacted version. The compacted version consists of many files, and the old version contains many files, but only one set or the other must exist at any time. The new files are created in an unlinked state and then atomically swapped for all the currently live files. In a crash or hang, the orphanage mechanism handles the deletion of pending files. This same general mechanism can be applied up the tree at higher levels as well.

Snapshots and Placement

A table is inside a volume and thus can be snapped at will. Multiple tables can also be in a volume and thus snapped together. This causes all data placement policies to apply, notably including first copy being local, the ability to pin volumes to part of the cluster.

Very Large Keys

B-trees need optimal, and a relatively large, branching factor. Super large keys defeat this. In MapR, very large keys are stored together in a large key file. What is stored in the b-tree is the offset of the key; the FID is already known. This 8-byte offset can stand in for the key.

This is acceptable because of two factors:

First, the first 100 bytes or so of the key are stored directly in the b-tree, which makes many comparisons work because the difference between adjacent keys is commonly in the prefix.

Second, the comparison of large keys is expensive enough to outweigh the following of the links to the full key. This allows short and long keys to be mixed in the same b-tree. In some limited circumstances, keys are added to the key file in a sorted order so the offset in the key file can be used to reliably order keys.

Read and Write Amplification Avoided

In embodiments of the invention, it is not just that write amplification is avoided. Hbase, in particular, has a very hard time avoiding read amplification. The use of Bloom filters at all levels avoids both read and write amplification.

Storage of Data on Solid State Disks

Embodiments of the invention described herein can store blocks of data on a solid-state disk (SSD) to optimize performance. In other systems, there is generally a choice that must be made between high performance and accessibility of data after power loss. High performance systems are generally used as caches for disk blocks and depend on an in-memory map that translates the desired disk block address into an SSD block address. This in-memory map is, however, large and it is generally infeasible to write this map to the SSD device. Because in-memory data structures are lost when power is removed, this map is also lost.

Another problem with these systems is that the in-memory structure is very large if the SSD is large. This leads to excessive use of memory simply as a page address translation map. The primary alternative to keeping this large in-memory map is to keep the map in the SSD itself. This generally requires a number of accesses to the SSD to find blocks resulting in poor performance.

Figure 10:
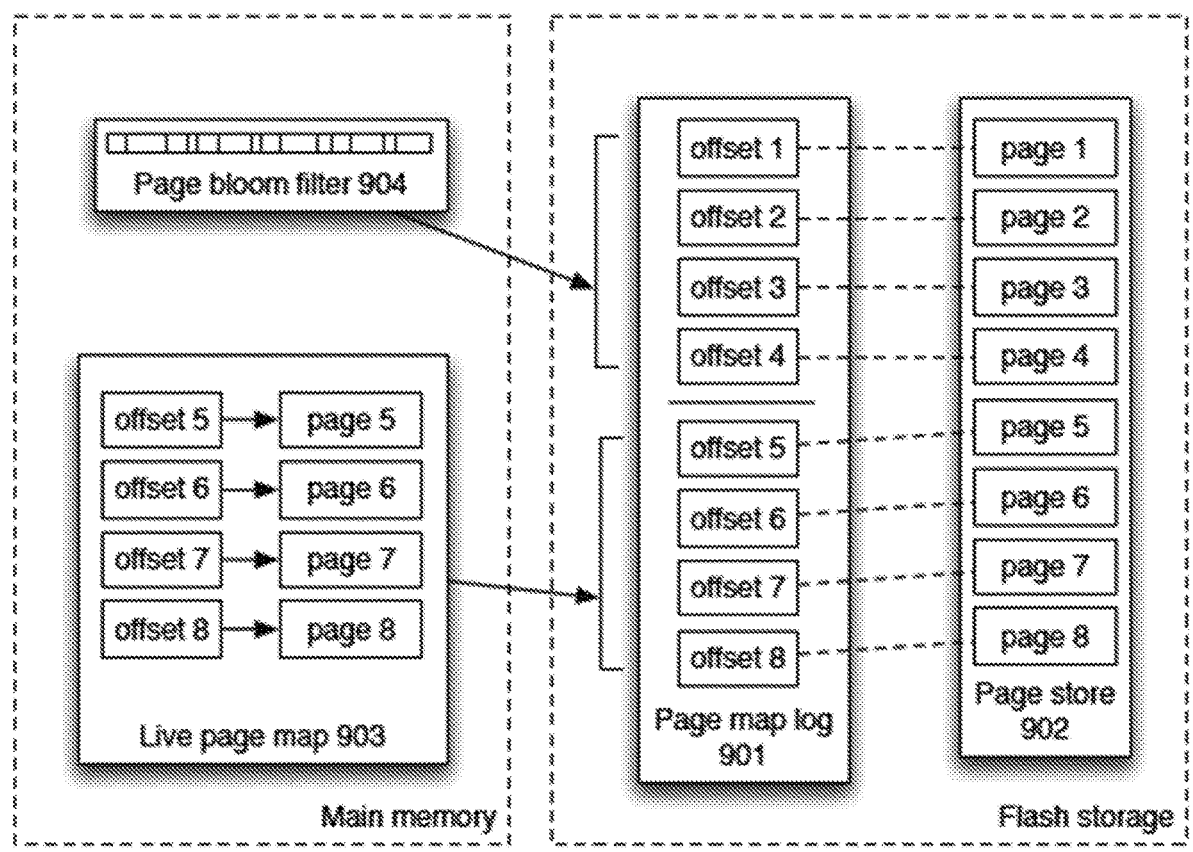
FIG. 10 is a block schematic diagram that shows the mapping from storage pool offsets to flash storage.

In FIG. 10, the mapping from storage pool offsets to flash storage is done by several mechanisms. As each page is written to flash storage, the storage pool offset for that page is also logged to a separate part of flash called the page map log. Each page has a corresponding entry in the log so only the externally known reference for the page need be written to the log. Recently written page mappings are also stored in a hash table in memory known as the live page map.

Once the live page map reaches a certain critical size, a new live page map is started and some time later, the old live page map is reduced to a Bloom filter to save space. The page map log takes about 12 bytes per 8K page for a reduction of 750 in size. The live page map occupies approximately 1.5*(12+6) bytes per entry, and each Bloom filter occupies about one byte per map entry. Thus, 1 TB of page store requires 1.3 GB of page map log. If live page maps are limited to 40 MB, they hold over 1.5 million entries out of the total of 130 million pages in the flash drive. Each Bloom filter requires 1.5 MB so that a synopsis of the entire flash drive requires less than about 250 MB of main memory for several page maps and a Bloom filter for each of the rest.

Notably, the in-memory directory can be reconstructed on power-up by scanning the page map log. This scan should only take a few seconds;

1 TB=134 million pages
40 MB hash table=1.5 million pages
134 million pages=89 tables or Bloom filters
1.5 MB=Bloom filter 3×hash table+90 Bloom filters=120 MB+135 MB=255 MB Thus, in embodiments of the invention described herein, SSD storage is divided into two regions. These regions are shown in FIG. 10 as the page map log 901 and the page block store 902. There is one entry in the page map log for each page in the page block store. The entries in the page map log contain the original address of the block being written in the form of a block address. This block address is only 12 bytes in size, which is much smaller than the 8K block size.

As blocks are written to the page block store 902 and their addresses are written to the page map log 901, the mapping from address to location in the SSD is also recorded in an in-memory table known as the live page map 903. For blocks that have an entry in this live page map, the location of the block on the SSD can be determined from the disk address of the block by a simple lookup in the live page map. When the live page map exceeds a certain minimum size, the addresses that are the keys for the table are recorded in a page Bloom filter 904. Eventually, the table itself is discarded so that only at most a few live page maps are kept fully in memory.

Most accesses to blocks in the SSD are to relatively recently written blocks, which still can be found in a live page map. Other blocks can be found by checking each page Bloom filter in order of increasing age until a filter is found that seems to contain the address of interest. The portion of the page map log corresponding to that Bloom filter is read into memory and reconstituted into a live page map.

This can be done easily because the location of each entry in the log can be converted into an SSD address by dividing by 12 and multiplying by the block size. The page map log takes about 12 bytes per 8K page for a reduction of 750 in size. The live page map occupies approximately 1.5*(12+6) bytes per entry and each Bloom filter occupies about one byte per map entry. Thus, 1 TB of page store requires 1.3 GB of page map log. If live page maps are limited to 40 MB, they hold over 1.5 million entries out of the total of 130 million pages in the flash drive. Each Bloom filter requires 1.5 MB so that a synopsis of the entire flash drive requires less than about 250 MB of main memory for several page maps and a Bloom filter for each of the rest.

Notably, the in-memory directory of live page maps and Bloom filters can be reconstructed on power-up by scanning the page map log. This scan should only take a few seconds. When the entire SSD has been nearly filled with blocks, the system starts checking blocks from the beginning of the SSD to see if they must be retained. Blocks that have been overwritten or discarded by the file system need not be retained.

Depending, too, on the policy for the file that the blocks belong to, it may be acceptable to only retain a copy of the block on rotating disks. Because it takes quite a while to fill a substantial SSD, it is very likely that a parallel write to rotating disk of such a block would have long since completed by the time the system comes back around to the block. All blocks that do not need to be retained can be skipped. The remaining blocks that must be retained can be copied to the end of the SSD, thus freeing the first sections of the SSD for use. This process can continue in a cyclic fashion with old retained blocks continuously being copied to make space for new writes.

This pattern of copying only blocks that need to be retained is done from the point that the SSD first fills up and continues from that point onward. Because the primary purpose of SSD's in a MapR system is as a write-through cache, almost all blocks do not need to be retained. In an alternative implementation, blocks that would otherwise be copied can be left in place and treated as if recently written. For nearly full SSD's with high retention rates copying imposes a high overhead, but copying as the advantage of making sure that old pages that are unlikely to be needed do not fill up the live page maps.

Figure 11:
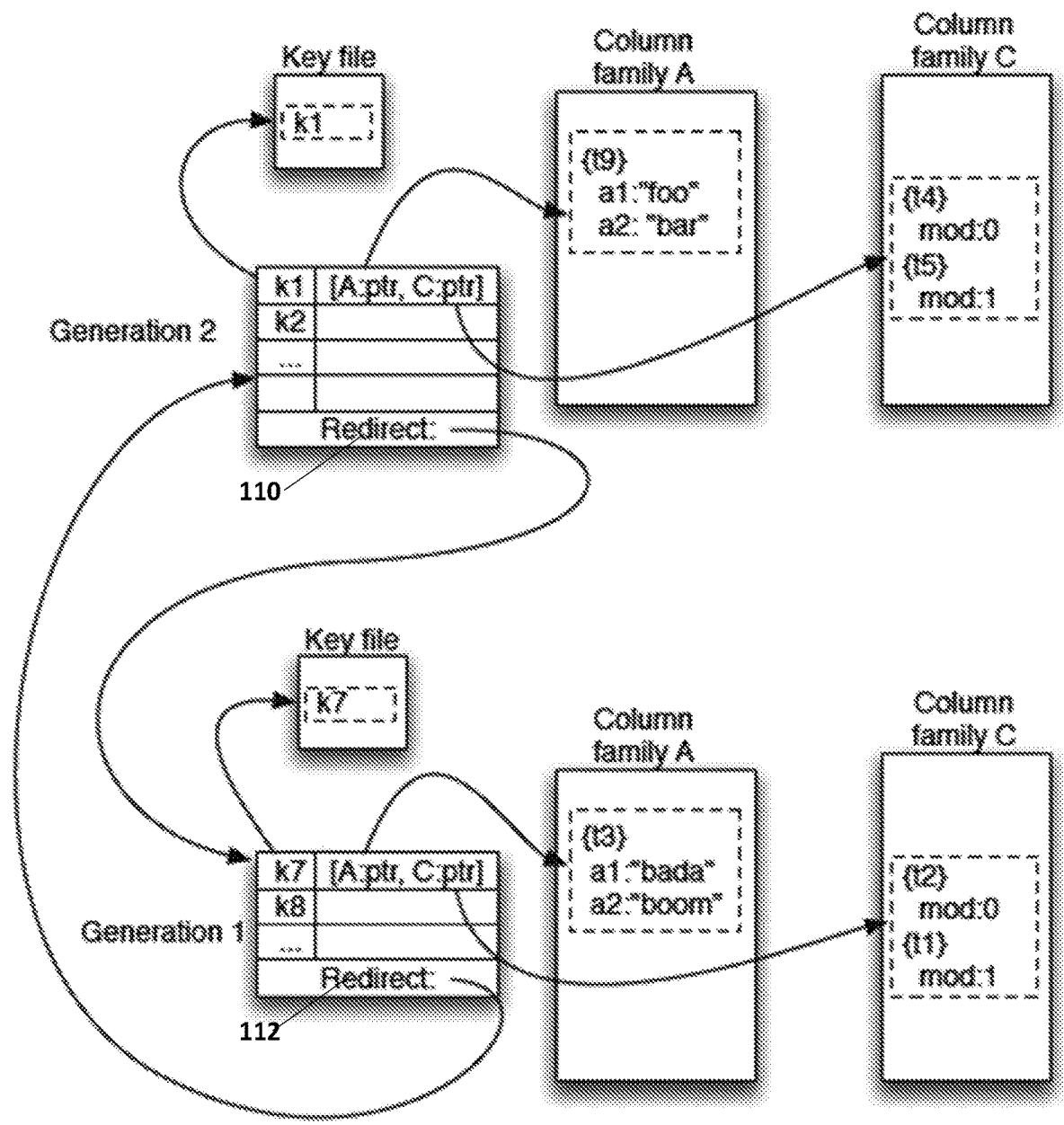
FIG. 11 is a block schematic diagram that shows a merge of Generation 1 and 2 of a single segment.

FIG. 11 shows a merge of Generation 1 and 2 of a single segment. In FIG. 11, during a segment merge or split, the redirect pointer 110, 112 is used to virtually merge two segments so that access to either considers the contents of the other as well. Thus, searching for k7 in the Generation 2 segment results in a success because the redirect pointer allows it to be found in the second segment. Redirect pointers are set using atomic operations and allow large scale operations such as segment splits to be done safely as a series of small steps.

Figure 12:
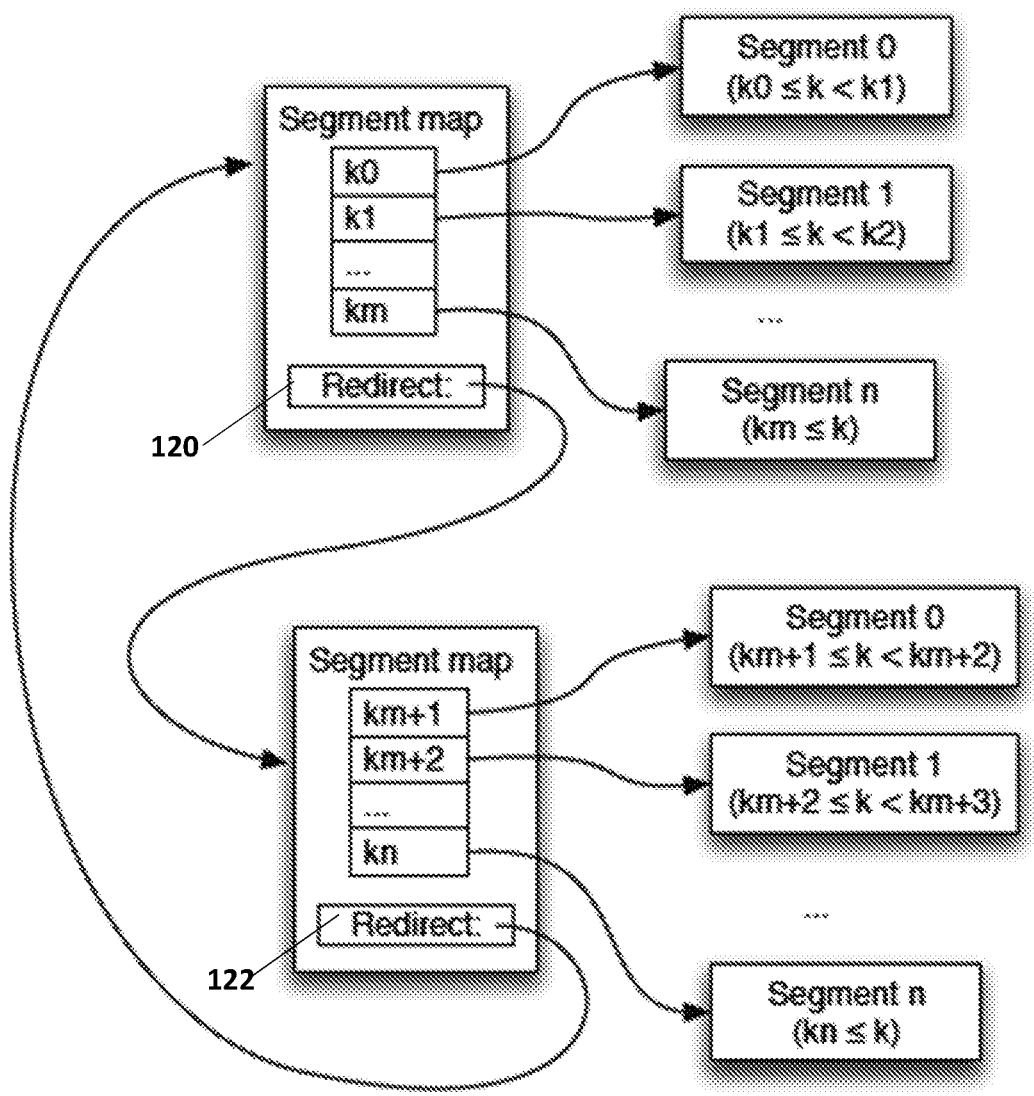
FIG. 12 is a block schematic diagram that shows the structure of segment map in which redirect links can be used to virtually merge two segment maps during a long running operation, such as a merge or split.

FIG. 12 shows the structure of segment map in which redirect links can be used to virtually merge two segment maps during a long running operation, such as a merge or split. Splits occur when a segment map grows to have more than a defined number of segments. Splitting a segment increases the number of segments in a partition. This could result in the partition having a larger than desired number of segments which would trigger the split of the partition. Splitting a partition could similarly result in the split of a tablet. Redirect pointers 120, 122 are used at each of these levels to allow these splits to be done as a sequence of small operations without stopping normal operations.

Computer Implementation

Figure 13:
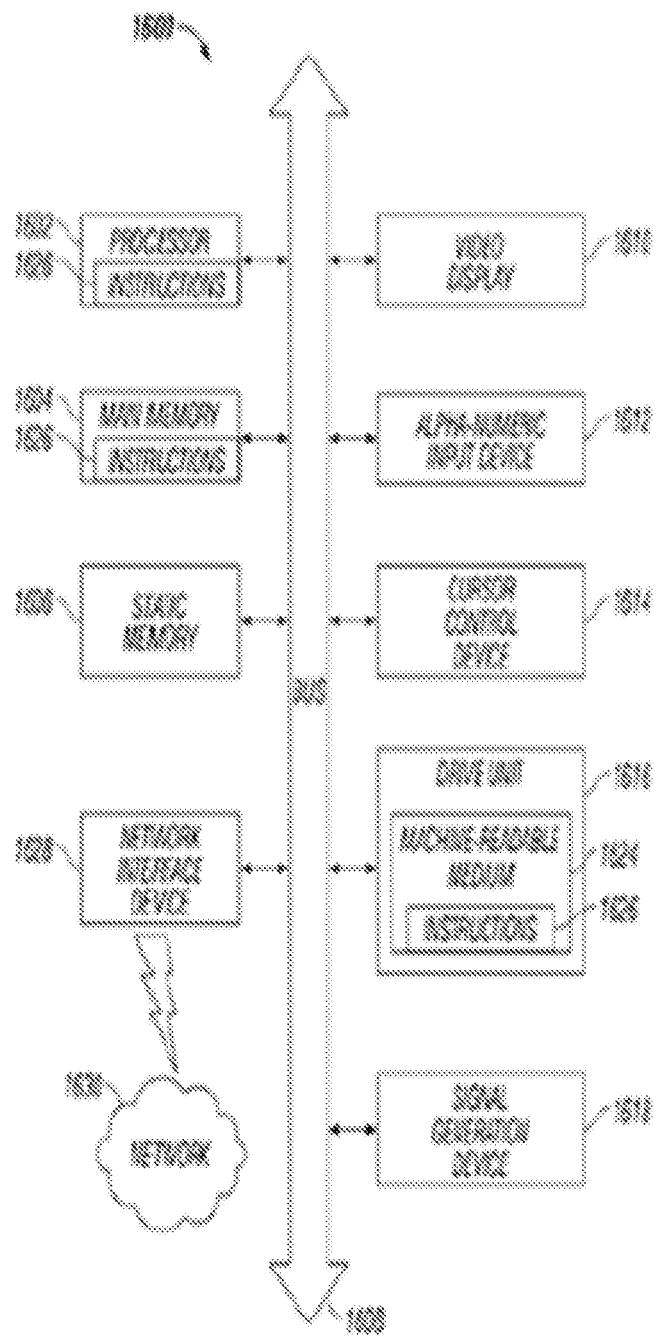
FIG. 13 is a block schematic diagram that depicts a machine in the exemplary form of a computer system within which a set of instructions for causing the machine to perform any of the herein disclosed methodologies may be executed.

FIG. 13 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604, and a static memory 1606, which communicate with each other via a bus 1608. The computer system 1600 may further include a display unit 1610, for example, a liquid crystal display (LCD). The computer system also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, such as the CPU of a computer, or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for column-oriented access to data, the method comprising:
providing a table of a key-value store, the key-value store providing access to a key-value database, the table having a key space for keys of the key-value database;
ordering the keys for the table;
recursively dividing the key space into successively smaller key ranges by dividing the table into tablets, partitions, and segments, wherein the table is divided into and contains tablets, each tablet of the tablets is divided into and contains partitions, and each partition of the partitions is divided into and contains segments, wherein each tablet has a range of keys of the key space, and wherein each partition of a tablet has a key sub-range of the range of keys of the tablet;
distributing operations on each of the tablets to a different compute node;
handling operations on each of the partitions or segments divided from each tablet by using different threads; and
implementing a tablet split operation on an original tablet of the tablets by performing a copy operation progressively with an increasing amount of the original tablet being mirrored to a new tablet copy, providing, among partitions of the original tablet, a mirrored range, and mirroring updates that are directed to the mirrored range of the original tablet to the new tablet copy.

2. The method of claim 1, wherein there is at least one bucket for each partition, the method further comprising:
writing updates for the key-value database to a current bucket for a partition;
allocating a new bucket once the current bucket gets to a defined size; and
distributing the updates from the current bucket to the segments of the partition.

3. The method of claim 1 further comprising:
using redirection links to allow data access to proceed during restructuring.

4. The method of claim 1 further comprising:
integrating the key-value store into a file system, wherein file system operations are performed directly on the key-value store.

5. The method of claim 4, wherein the file system operations include snapshots or mirrors.

6. The method of claim 1 further comprising:
decomposing large-scale restructuring operations into operations on individual ones of the partitions or the segments.

7. The method of claim 1, wherein the table is read-only, the method further comprising opening the table without performing recovery operations.

8. The method of claim 1 further comprising:
synchronizing operations with a file system of the key-value store, wherein a table snapshot is directly usable.

9. The method of claim 1, wherein the table is divided into tablets numbering on the order of at least tens of thousands.

10. The method of claim 1, wherein at least some of the tablets are distributed across a cluster or multiple clusters.

11. The method of claim 1, wherein the tablet split operation further comprises:
further providing, among the partitions of the original tablet, a copy window and a pending copies region;
mirroring updates that are directed to the mirrored range of the original tablet to the new tablet copy;
holding back updates directed to the copy window while the copy operation proceeds in the copy window;
after the copy operation in the copy window completes, adding the copy window to the mirrored range; and
not mirroring updates directed to the pending copies region of the original tablet to the new tablet copy.

12. The method of claim 11, further comprising:
during the copy operation, dividing a key range of the original tablet, wherein a first part comprises an uncopied range that consists of keys that remain in the original tablet;
wherein keys that are copied are divided into three parts comprising:
the mirrored range including keys that have already been copied;
the copy window including keys that are currently being copied; and
the pending copies region including data associated with keys after a cursor range.

13. The method of claim 12, further comprising:
for keys in the uncopied range, applying all updates only to the original tablet;
for keys in the mirrored range, forwarding all updates received by the original tablet to the new tablet copy and returning acknowledgements after both updates have been applied; and
for keys in the copy window, holding back all updates while the keys and data in the copy window are copied;
wherein as soon as the copy window is moved forward to a new set of keys from a pending range, the updates are released;
wherein when the updates are released, keys that were previously in the copy window are now in the mirrored range and the updates are applied to both the original tablet and the new copy tablet; and
wherein in the pending range, all updates are applied to the original tablet.

14. A computer-implemented method comprising:
providing a table of a key-value store, the key-value store providing access to a key-value database, the table having a key space for keys of the key-value database, wherein the table recursively divides the key space into successively smaller key ranges by dividing the table into tablets, partitions, and segments, and wherein the table is divided into and contains tablets, each tablet of the tablets is divided into and contains partitions, and each partition of the partitions is divided into and contains segments, and wherein each tablet has a range of keys of the key space, and each partition of a tablet has an actively updated bucket and a key sub-range of the range of keys of the tablet;
writing updates for the key-value database to an actively updated bucket for a partition;
once the actively updated bucket reaches a defined size, spilling the actively updated bucket to the segments of the partition and allocating a new bucket to replace the actively updated bucket; and
implementing a tablet split operation on an original tablet of the tablets by performing a copy operation progressively with an increasing amount of the original tablet being mirrored to a new tablet copy, providing, among partitions of the original tablet, a mirrored range, and mirroring updates that are directed to the mirrored range of the original tablet to the new tablet copy.

15. The method of claim 14 further comprising:
emulating different interfaces by different application libraries on the table.

16. The method of claim 14 further comprising:
independently configuring any of keys and data for any of persistent residence in memory, storage on a solid-state disk, and storage on a hard disk; and
adjusting performance relative to cost per column family of the table.

17. The method of claim 16 further comprising:
distributing the tablets across any of a very large cluster and multiple clusters;
handling each tablet by a file system process running on a node; and
handling all operations on tablets by a native component of a corresponding file system process.

18. The method of claim 14 further comprising:
using redirect pointers in two tablets of the tablets to allow the two tablets to function as one tablet during an operation.

19. The method of claim 14 further comprising:
performing a tablet merge operation of two tablets of the tablets by allocating buckets in a surviving tablet of the two tablets, wherein redirect pointers in the two tablets make the two tablets appear as one during the tablet merge operation; and
copying segment maps to the surviving tablet; and
removing the redirect pointers when the tablet merge operation is done and the surviving tablet is a complete merge of the two tablets.

20. The method of claim 14, wherein the tablet split operation further comprises:
further providing, among the partitions of the original tablet, a copy window and a pending copies region;
mirroring updates that are directed to the mirrored range of the original tablet to the new tablet copy;
holding back updates directed to the copy window while the copy operation proceeds in the copy window;
after the copy operation in the copy window completes, adding the copy window to the mirrored range; and
not mirroring updates directed to the pending copies region of the original tablet to the new tablet copy.

21. The method of claim 20 further comprising:
during the copy operation, dividing a key range of the original tablet, wherein a first part comprises an uncopied range that consists of keys that remain in the original tablet;
wherein keys that are copied are divided into three parts comprising:

the mirrored range including keys that have already been copied;

the copy window including keys that are currently being copied; and the pending copies region including data associated with keys after a cursor range.

22. The method of claim 21 further comprising:

for keys in the uncopied range, applying all updates only to the original tablet;

for keys in the mirrored range, forwarding all updates received by the original tablet to the new tablet copy and returning acknowledgements after both updates have been applied; and for keys in the copy window, holding back all updates while the keys and data in the copy window are copied;

wherein as soon as the copy window is moved forward to a new set of keys from a pending range, the updates are released;

wherein when the updates are released, keys that were previously in the copy window are now in the mirrored range and the updates are applied to both the original tablet and the new copy tablet; and wherein in the pending range, all updates are applied to the original tablet.

23. A non-transitory computer-readable storage medium having stored thereon executable computer program instructions that, when executed by a processor, cause the processor to perform operations comprising:

providing a table of a key-value store, the key-value store providing access to a key-value database for a file system, the table having a key space for keys of the key-value database;

ordering the keys for the table;

recursively dividing the key space into successively smaller key ranges by dividing the table into tablets, partitions, and segments, wherein the table is divided into and contains tablets, each tablet of the tablets is divided into and contains partitions, and each partition of the partitions is divided into and contains segments, wherein each tablet has a range of keys of the key space, and wherein each partition of a tablet has a key sub-range of the range of keys of the tablet;

distributing operations on each of the tablets to a different compute node of a plurality of compute nodes;

handling operations on each of the partitions or segments divided from each tablet by using different threads; and implementing a tablet split operation on an original tablet of the tablets by performing a copy operation progressively with an increasing amount of the original tablet being mirrored to a new tablet copy, providing, among partitions of the original tablet, a mirrored range, and mirroring updates that are directed to the mirrored range of the original tablet to the new tablet copy.

24. The storage medium of claim 23, wherein the tablet split operation further comprises:

further providing, among the partitions of the original tablet, a copy window and a pending copies region;

mirroring updates that are directed to the mirrored range of the original tablet to the new tablet copy;

holding back updates directed to the copy window while the copy operation proceeds in the copy window;

after the copy operation in the copy window completes, adding the copy window to the mirrored range; and not mirroring updates directed to the pending copies region of the original tablet to the new tablet copy.

* * * * *